United States Patent [19]

Arnold, Jr. et al.

[11] Patent Number: 4,714,663

[45] Date of Patent: Dec. 22, 1987

[54] SULFONATED POLYSULFONE BATTERY MEMBRANE FOR USE IN CORROSIVE ENVIRONMENTS

[75] Inventors: Charles Arnold, Jr.; Roger Assink, both of Albuquerque, N. Mex.

[73] Assignee: The United States of America as represented by the United States Department of Energy, Washington, D.C.

[21] Appl. No.: 918,194

[22] Filed: Oct. 14, 1986

[51] Int. Cl.$^4$ ............................................. H01M 6/24
[52] U.S. Cl. ..................................... 429/101; 429/107; 429/249
[58] Field of Search ............... 429/101, 107, 105, 229, 429/221, 207, 206, 249; 204/296

[56] References Cited

U.S. PATENT DOCUMENTS

| | | | |
|---|---|---|---|
| 3,998,871 | 12/1976 | Carlson | 429/249 X |
| 4,049,886 | 9/1977 | Will | 429/249 X |
| 4,157,423 | 6/1979 | Gadessaud | 429/206 |
| 4,180,623 | 12/1979 | Adams | 429/107 |
| 4,260,874 | 4/1981 | Will | 429/246 X |
| 4,352,864 | 10/1982 | Struthers | 429/101 X |
| 4,382,116 | 5/1983 | Gahn et al. | 429/105 X |

*Primary Examiner*—Anthony Skapars
*Attorney, Agent, or Firm*—Armand McMillan; Judson R. Hightower

[57] ABSTRACT

For batteries containing strong oxidizing electrolyte and a membrane separating two electrolyte solutions, e.g., a zinc ferricyanide battery, an improved membrane is provided comprising an oxidative resistant, conductive, ion-selective membrane fabricated from a catenated aromatic polymer having an absence of tertiary hydrogens, e.g., a sulfonated polysulfone.

20 Claims, No Drawings

SULFONATED POLYSULFONE BATTERY MEMBRANE FOR USE IN CORROSIVE ENVIRONMENTS

The U.S. Government has rights in this invention pursuant to Contract No. DE-AC04-76DP00789 between the U.S. Department of Energy and AT&T Technologies, Inc.

BACKGROUND OF THE INVENTION

1. Field of the Invention

This invention relates to electrochemical storage devices such as batteries, and in particular to such devices which contain strong oxidizing agents as electrolytes, and more particularly to an improvement in the cationic separator employed in zinc-ferricyanide batteries and the like.

2. Description of the Prior Art

Membranes both of the cationic and anionic type, have found use in electrochemical storage devices to separate the electrolytes. In many applications, such as the zincferricyanide battery, the particular membrane utilized is required to exhibit a high degree of chemical stability, due to the high reactivity of the electrolytes. In the zincferricyanide battery, the catholyte is a strongly alkaline mixture of sodium ferri- and ferrocyanide. Alkaline ferricyanide is a moderately strong oxidizing agent which is capable of oxidizing a variety of organic compounds, such as phenols and alkyl-substituted aromatics, such as disclosed by B. S. Thyagarajan, *Chem. Revs.*, 58, p. 439 (1958), and E. Muller et al., *Ber.*, 93, p. 2649 (1960).

The prior art is replete with a wide variety of membranes for batteries, for example:

U.S. Pat. No. 4,157,423 discloses a separator which contains a preponderance of tertiary hydrogens, and thus is highly susceptible to oxidative attack of the ferricyanide.

U.S. Pat. No. 4,251,605 discloses acrylonitrile polymers that contain sulfonic acid groups which are of relatively unsatisfactory stability in the presence of oxidizing agents and strong alkali solutions.

U.S. Patent No. 3,998,871 discloses sulfonated isocyanate compositions which also have a relatively unsatisfactory resistance to oxidation.

U.S. Pat. No. 3,944,435; 4,260,874; and 4,049,866 may be of interest, but the batteries described in the patents are all based on electrolytes that are not capable of oxidation, while only the electrodes are electrochemically active. The pores of the separators utilized are filled with a single electrolyte. In contrast, in the present invention it is desired to obtain an improved membrane which would be resistant to corrosive environments, i.e., oxidizing and/or strongly alkali solutions. Other patents which may be considered pertinent are U.S. Pat. No. 3,709,841 and 3,855,122, but these patents relate to desalination, not devices for the storage of electrical energy such as batteries.

In any case, the art has been unable to develop a membrane which possesses adequate stability under oxidative environments such as the zinc ferricyanide battery. Currently, the only cationic membrane which exhibits sufficient stability is made from Nafion ®, a perfluorosulfonate developed by Du Pont, which is extremely expensive, and thus unsuitable for applications such as batteries which are utilized for utility load leveling applications, and the like.

OBJECTS OF THE INVENTION

Accordingly, an object of the invention is to provide an improved electrochemical storage device based on an inexpensive, effective membrane which is particularly stable in chemically oxidative environments, such as alkaline ferricyanide and which is sufficiently conductive and selective to ion permeation.

It is another object of this invention to provide a composite sulfonated polysulfone membrane which exhibits excellent stability in corrosive environments such as the zinc ferricyanide battery.

Upon further study of the specification and appended claims, further objects and advantages of this invention will become apparent to those skilled in the art.

SUMMARY OF THE INVENTION

Accordingly, in an article aspect, the invention comprises in a device for the production and storage of electrical energy by electrochemical methods, which device contains a membrane separating two electrolyte solutions, the improvement wherein the membrane is an oxidative resistant, conductive, ion selective membrane, fabricated from an catenated aromatic polymer having an absence of tertiary hydrogens.

The prior art currently makes commercial membranes such as those disclosed in the patents mentioned above, which contain tertiary hydrogens in the repeating carbon chain, such as sulfonated polystyrene, e.g.,

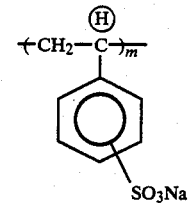

As is seen above, the circled hydrogen, i.e., tertiary hydrogen is bounded to a tertiary carbon atom, which is a carbon that is covalently bonded to three other carbon atoms, as well as the aforementioned tertiary hydrogen. These tertiary hydrogens are particularly vulnerable to corrosive oxidizing environments, and since it is readily apparent that half of the carbons in the backbone of the sulfonated polystyrene are tertiary, it is not surprising that this material is not particularly stable in chemical oxidizing media, such as alkaline ferricyanide. In fact, sulfonated polystyrene membranes lose about 20–30% of their original weight after exposure to a saturated solution of sodium ferricyanide in 5N sodium hydroxide at 50° C. after one week, in addition to a 50% loss in the membrane's modulus of elasticity.

Although applicants do not wish to be bound by theory, an element of their invention is the assumption that membranes which do not contain tertiary hydrogens should be more stable in a chemically oxidative environment than membranes which do contain tertiary hydrogens.

In a preferred embodiment, it is known that sulfonated polysulfones not having tertiary hydrogens are readily prepared via sulfonation of aromatic polysulfones such as those commercially sold under the trade name "Udel P1700" (Union Carbide). An article by A. Noshay and L. M. Robason, *J. Appl. Polymer Science,* 20, p. 1885–1903 (1976) incorporated by reference herein, discloses that the chain cleavage which occurs during sulfonation of aromatic polymers, polysulfones in particular, can be avoided if mild sulfonating agents, such as the complexes of $SO_3$ and triethylphosphate (TEP) are utilized. In this same article, it is stated that sulfonated polysulfone membranes have been reported to be useful in desalination applications, citing U.S. Pat. Nos. 3,709,841 (Quentin), issued Jan. 9, 1973 and 3,855,122 (Bournagel), issued Dec. 17, 1974. Sulfonated polysulfones produced by the method of Noshay and Robeson have the following structural formula:

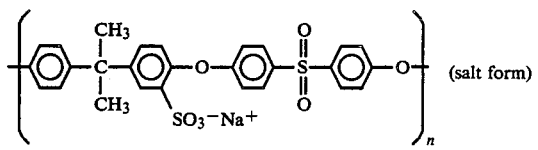 (salt form)

and, form the corresponding acid structures, e.g.,

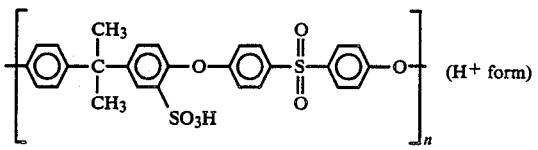 ($H^+$ form)

These polymers can be fabricated into membranes by casting dense films from solutions of these materials in solvents such as DMF. As an alternative to cast membranes, this invention also provides composite membranes produced by impregnating a microporous film, e.g., microporous poly(tetrafluoroethylene) with a solution of the sulfonated polysulfone.

Fabrication of the membranes from the salt form of the polymer is much preferred, although as will be apparent to one skilled in the art, the acid form would be converted to the salt form during use in the oxidative environments employed.

The degree of sulfonation of the polymer can range from about 0.2 to 2.0, preferably, about 1.2 to 1.6 sulfonate groups per repeat unit.

The molecular weight of the resulting polymers can range from about 10,000 to 40,000, preferably, about 15,000 to 25,000.

The class of membranes suitable for use in the electrochemical cells of the invention can, in the broadest embodiment of this invention, comprise the use of the homo and copolymers selected from a variety of catenated aromatic backbone polymers either with or without linking groups; preferably, without tertiary hydrogens present in the linking groups; e.g., polyphenylene, polyphenylene oxides, and the like. The most preferred class of polymers are the sulfonated polysulfonates.

The membranes suitable for usage exhibit area resistivities ranging from about 0.1 to 10.0 ohms/$cm^2$, preferably about 0.5 to 2.0 ohms/$cm^2$, and are particularly amenable to the passage of sodium and other positive ions, while prohibiting the passage of negative ions and complexes, such as ferricyanide, and the like, as will be readily apparent to one skilled in the art. In a preferred embodiment, membrane exhibit a rate of iron transport below about $10^{-2}$ mmoles Fe/$cm^2$/hr, preferably below at least $4 \times 10^{-4}$ mmoles Fe/$cm^2$/hr. Additionally, of course, it is essential that the fabricated membranes be both inexpensively produced and have superior resistance in high oxidative type environments in the presence of oxidative electrolytes such as are present in the zinc ferricyanide battery.

The fabricated membrane displays excellent oxidative resistance in a wide variety of chemically oxidative solutions besides ferricyanide, including $Co^{3+}$, $Cr^{3+}$, $V^{+5}$ and other transition metal ions.

The batteries of this invention generally comprise a container, electrolyte, a negative electrode and a positive electrode separated by a membrane permeable to said electrolyte but not permeable to negative ions thereby separating the two different electrolyte solutions. Such batteries are generally conventional and for a schematic drawing of a conventional battery, attention is invited to FIG. 1 of U.S. Pat. No. 4,157,423, incorporated by reference herein—albeit that the nature of the electrode separator and electrolyte differ in this invention. A preferred battery is the zinc-ferricyanide battery and for further details of this battery, reference is invited to the article by G. B. Adams et al, *Proceedings of the Sixteenth Intersociety Energy Conversion Engineering Conference,* August (1981); incorporated herein.

Without further elaboration, it is believed that one skilled in the art can, using the preceding description, utilize the present invention to its fullest extent. The following preferred specific embodiments are, therefore, to be construed as merely illustrative, and not a limitation of the remainder of the disclosure in any way whatsoever.

In the preceding text and the following examples, all temperatures are set forth uncorrected in degree Celsius and all parts and percentages are by weight, unless otherwise indicated.

EXAMPLE 1

Cast membranes made from the sodium salt form of the sulfonated polysulfone were prepared as follows:

Using 1,2-dichloroethane as the solvent, polysulfone samples sold under the trade name, Udel P1700®, having the structural formula depicted above prior to sulfonation and an average molecular weight of 20,000, were sulfonated to degrees of about 1.2–1.6, using $SO_3$/TEP (triethylphosphate) complexes. The acid form of the sulfonated polysulfone was then converted to the salt form by dissolution in 2-propanol and neutralization with methanolic sodium hydroxide. The resin was then filtered, throughly extracted with water and dried. Solutions of the resin (10 to 20% by weight) in dimethylformamide (DMF) were then cast from hot (60°–80° C.) solutions onto a releasable substrate, the thickness of the cast solution ranging from about 0.008 to 0.04 cm. The resulting membranes exhibited area resistivities in 5N NaOH of 1.0–2.0 ohms/$cm^2$ and an iron permeation rate of $10^{-5}$ mmoles Fe/$cm^2$/hr. As the CA 10/7/86 degree of sulfonation increased within the range of 1.2–1.6, the area resistivity decreased, but there was no apparent effect on the CA 10/7/86 rate of iron permeation.

These membranes were utilized in a single cell test unit fabricated with cadmium coated iron as the anode and a porous carbon graphite material as the cathode. Both the electrode and membranes had areas of 60 $cm^2$; the cell was then cycled at a current density of 35 mA/$cm^2$. One cycle lasted 4 hours (2 hour charge and a 2 hour discharge). Efficiencies of 77% were realized over 85 cycles.

EXAMPLE 2—PREPARATION OF COMPOSITE MEMBRANE

Microporous polytetrafluorethylene sold under the tradename "Gortex" and having an average pore size of 0.2 microns was impregnated for 24 hours at room temperature with a dimethyl formamide solution of 20% by weight of a sulfonated polysulfone prepared as in Example 1 and having a sulfonation degree of 1.2–1.6, and a small amount, e.g., 0.1–1.0% based on the sulfonated polysulfone, of FC-98(®), a wetting agent sold by 3M and comprising a fluorinated carboxylic acid. After removal of the solvent after the impregnation period of 24 hrs., a weight gain of about 70% had occurred and electron microprobe analysis for sulfur showed that penstration of the polysulfone through the thickness dimension of the film was complete. Although the area resistivity of this membrane was desirably low (less than about 1 ohm/cm$^2$), the rate of iron permeation was higher than optimum (about $10^{-3}$ mmoles Fe/cm$^2$/hr).

EXAMPLE 3

Following the procedure of Example 2, two impregnations were carried out instead of one, with the temperature of each impregnation being increased to 125° C. from 25° C., while the soak time was reduced from 24 hours to 10 minutes. The resulting rate of iron permeation was greatlly reduced to $1 \times 10^{-5}$ mmoles Fe/hr/cm$^2$, while the resistance increased from about 1 ohm/cm$^2$ to about 6 ohm/cm$^2$.

EXAMPLE 4 THE USE OF A CAST SULFONATED POLYSULFONE

Membrane in a Battery Containing a Strongly Oxidizing Electrolyte

Membranes of sulfonated polysulfone in the sodium salt form were cast onto glass plates from solutions of the polymer in DMF as prepared in Example 1, followed by a heat treatment at 110° C. for one hour to remove the DMF solvent. The resulting area resistivities of the produced films in 5N NaOH was 3–4 ohms/cm$^2$. Iron transportation rates were less than $10^{-5}$ mmoles of Fa/hr/cm$^2$ when the resulting membrane was placed in a saturated aqueous solution of sodium ferricyanide in 5N sodium hydroxide at 50° C. To determine the stability of the sulfonated polysulfone membranes in alkaline ferricyanide, the membranes were immersed in a saturated solution of sodium ferricyanide and 5N NaOH for one week, at 50° C. The results showed a 20% decrease in shear modulus of the membrane, which may have been caused by plasticization, but otherwise the sulfonated polysulfone membranes were unaffected by exposure to the alkaline ferricyanide. No weight loss occurred, and the area resistivity and iron permeation rates were unchanged. IR analysis showed no apparent chemical changes and there was no change in ion exchange capacity, i.e., it remained constant at 1.4 meg/dry gram of polymer.

The formed membranes were then tested for evaluation in a zinc ferricyanide battery. Energy efficiencies, as measured in Example 1, of 70% over 170 charge-discharge cycles were realized.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a device for the production of electrical energy by electrochemical methods, which device contains an electrolyte and a membrane separating two electrolyte solutions, the improvement wherein the membrane is an oxidative resistant, conductive, ion-selective membrane comprising a catenated aromatic polymer having an absence of tertiary hydrogens.

2. In a device according to claim 1, wherein the membrane comprises a sulfonated aromatic polysulfone.

3. In a device according to claim 2, wherein the degree of sulfonation ranges from about 0.2 to 2.0 sulfonate units per repeating unit in the polymer.

4. In a device according to claim 2, wherein the polymer has a molecular weight from about 10,000 to 40,000.

5. In a device according to claim 3, wherein the polymer has a molecular weight from about 10,000 to 40,000.

6. In a device according to claim 2, wherein the membrane is a composite of a microporous substrate impregnated with the sulfonated polysulfone.

7. In a device according to claim 6, wherein the microporous support is poly(tetrafluoroethylene).

8. In a device according to claim 1, wherein the membrane consists essentially of cast sulfonated polysulfones.

9. The device of claim 1, being a zinc ferricyanide battery.

10. The device of claim 2, being a zinc ferricyanide battery.

11. The device of claim 3, being a zinc ferricyanide battery.

12. The device of claim 4, being a zinc ferricyanide battery.

13. The device of claim 5, being a zinc ferricanide battery.

14. The device of claim 6, being a zinc ferricyanide battery.

15. The device of claim 7, being a zinc ferricyanide battery.

16. The device of claim 8, being a zinc ferricyanide battery.

17. In a device according to claim 1, wherein the membranes exhibit area resistivities ranging from about 0.5 to 2.0 ohms/cm$^2$.

18. In a device according to claim 1, wherein the membranes exhibit a rate of ion transport ranging of less than about $10^{-2}$ mmoles Fe/cm$^2$/hr.

19. In a device according to claim 2, wherein the membranes exhibit area resistivities range from about 0.5 to 2.0 ohms/cm$^2$.

20. In a device according to claim 19, wherein the membranes exhibit a rate of ion transport range of less than about $10^{-2}$ mmoles Fe/cm$^2$/hr.

* * * * *